United States Patent
De et al.

(10) Patent No.: US 10,897,364 B2
(45) Date of Patent: Jan. 19, 2021

(54) PHYSICALLY UNCLONABLE FUNCTION IMPLEMENTED WITH SPIN ORBIT COUPLING BASED MAGNETIC MEMORY

(71) Applicant: Intel Corporation, Santa Clara, CA (US)

(72) Inventors: Vivek De, Beaverton, OR (US); Krishnan Ravichandran, Saratoga, CA (US); Harish Krishnamurthy, Beaverton, OR (US); Khondker Ahmed, Hillsboro, OR (US); Sriram Vangal, Portland, OR (US); Vaibhav Vaidya, Portland, OR (US); Turbo Majumder, Portland, OR (US); Christopher Schaef, Hillsboro, OR (US); Suhwan Kim, Hillsboro, OR (US); Xiaosen Liu, Portland, OR (US); Nachiket Desai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 15/846,045

(22) Filed: Dec. 18, 2017

(65) Prior Publication Data
US 2019/0190725 A1    Jun. 20, 2019

(51) Int. Cl.
*H04L 9/32*    (2006.01)

(52) U.S. Cl.
CPC ................................. *H04L 9/3278* (2013.01)

(58) Field of Classification Search
CPC . H04L 9/3278; H04L 9/32; G06F 2221/2129; G06F 2212/1052; G06F 12/14; G06F 12/1408; G06F 21/73; G06F 21/45
(Continued)

(56) References Cited

U.S. PATENT DOCUMENTS

| | | | |
|---|---|---|---|
| 5,802,583 A * | 9/1998 | Yeager | G06F 12/1433 |
| | | | 365/145 |
| 8,516,269 B1 * | 8/2013 | Hamlet | G06F 21/445 |
| | | | 713/189 |

(Continued)

FOREIGN PATENT DOCUMENTS

| | | | |
|---|---|---|---|
| WO | 2017034563 | 3/2017 | |
| WO | WO-2017034563 A1 * | 3/2017 | ......... G11C 11/1675 |

OTHER PUBLICATIONS

International Search Report and Written Opinion from PCT/US2018/061863 notified Mar. 14, 2019, 15 pgs.

(Continued)

*Primary Examiner* — Saleh Najjar
*Assistant Examiner* — Khalid M Almaghayreh
(74) *Attorney, Agent, or Firm* — Green, Howard & Mughal LLP

(57) ABSTRACT

Spin Hall Effect (SHE) magneto junction memory cells (e.g., magnetic tunneling junction (MTJ) or spin valve based memory cells) are used to implement high entropy physically unclonable function (PUF) arrays utilizing stochastics interactions of both parameter variations of the SHE-MTJ structures as well as random thermal noises. An apparatus is provided which comprises: an array of PUF devices, wherein an individual device of the array comprises a magnetic junction and an interconnect, wherein the interconnect comprises a spin orbit coupling material; a circuitry to sense values stored in the array, and to provide an output; and a comparator to compare the output with a code.

24 Claims, 12 Drawing Sheets

(58) Field of Classification Search
USPC .................... 713/161, 189; 711/100, 101
See application file for complete search history.

(56) References Cited

U.S. PATENT DOCUMENTS

| | | | | |
|---|---|---|---|---|
| 2003/0204743 | A1* | 10/2003 | Devadas | G06Q 20/3674 726/9 |
| 2010/0250936 | A1* | 9/2010 | Kusakawa | H04L 9/3278 713/169 |
| 2012/0020152 | A1* | 1/2012 | Gaudin | G11C 11/1675 365/171 |
| 2014/0010004 | A1* | 1/2014 | Suzuki | H01L 43/02 365/158 |
| 2014/0169088 | A1* | 6/2014 | Buhrman | H01F 10/3286 365/158 |
| 2014/0175574 | A1* | 6/2014 | Watts | G11C 11/161 257/421 |
| 2014/0175582 | A1* | 6/2014 | Apalkov | G11C 11/1675 257/425 |
| 2014/0189365 | A1* | 7/2014 | Cox | H04L 9/0866 713/189 |
| 2014/0325237 | A1* | 10/2014 | Van Der Leest | H04L 9/0866 713/189 |
| 2015/0071432 | A1* | 3/2015 | Zhu | G11C 11/161 380/28 |
| 2015/0207627 | A1* | 7/2015 | Yamamoto | H04L 9/3278 713/168 |
| 2016/0301534 | A1* | 10/2016 | Chen | H04L 9/3278 |
| 2017/0048072 | A1* | 2/2017 | Cambou | G09C 1/00 |
| 2017/0214532 | A1* | 7/2017 | Das | G11C 11/161 |

OTHER PUBLICATIONS

International Preliminary Report on Patentability from PCT/US2018/061863 notified Jul. 2, 2020, 12 pgs.

* cited by examiner

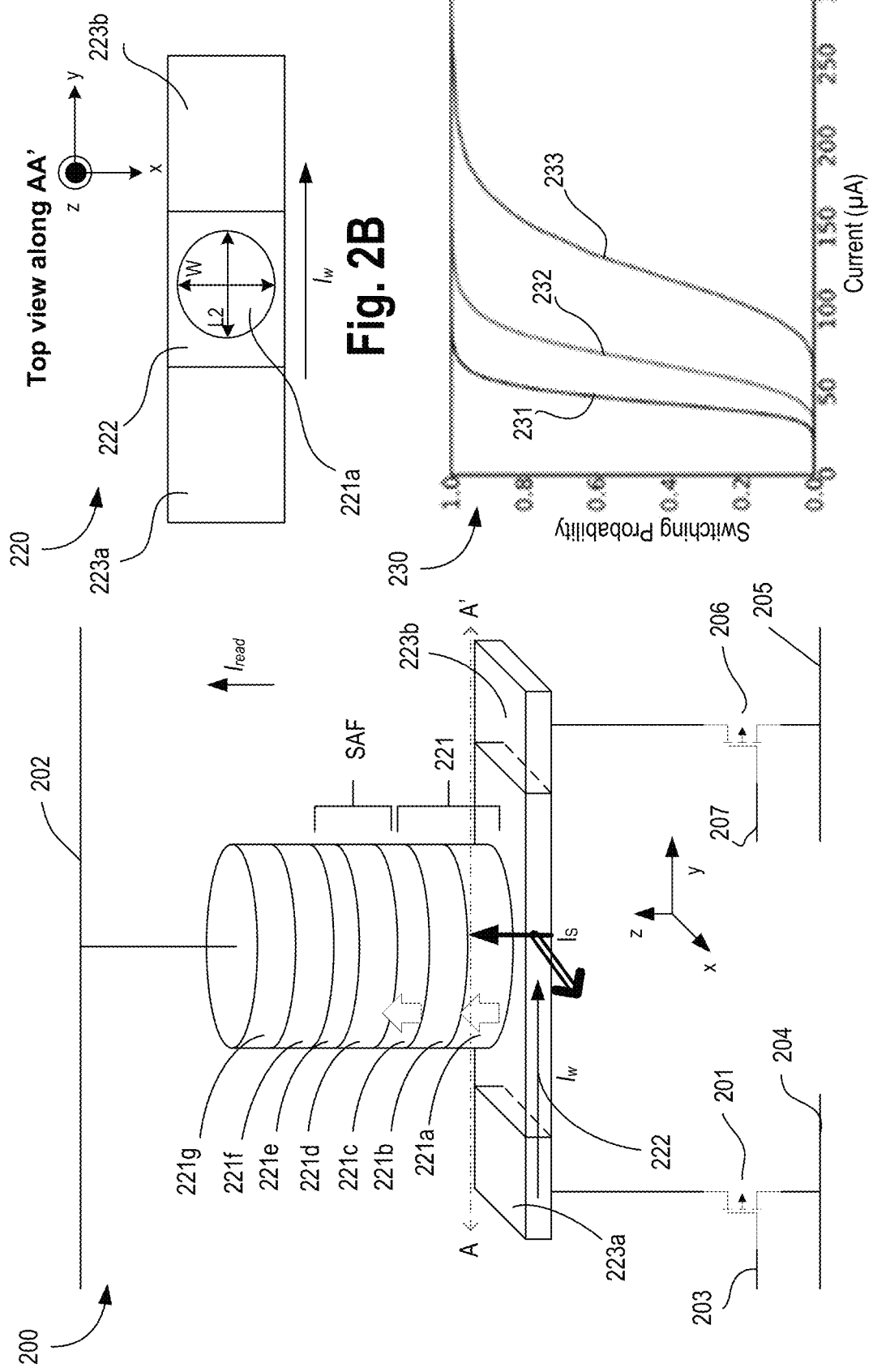

PHYSICALLY UNCLONABLE FUNCTION IMPLEMENTED WITH SPIN ORBIT COUPLING BASED MAGNETIC MEMORY

BACKGROUND

Authentication and security of computing devices is becoming a challenge as more and more computing devices are hacked or compromised by malicious attacks. For example, in an Internet-of-Things (IoT) system comprising edge devices, malicious attack on the edge devices can disrupt the IoT system.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 2A-B illustrate a three-dimensional (3D) view and corresponding top view, respectively, of a device having an out-of-plane MTJ stack coupled to a spin orbit coupling (SOC) interconnect, and having two select transistors.

FIG. 2C illustrates a plot showing stochastic write behavior of the MTJ of FIG. 2A as a function of write current amplitude and pulse width.

DETAILED DESCRIPTION

Figures 1A, 1B:
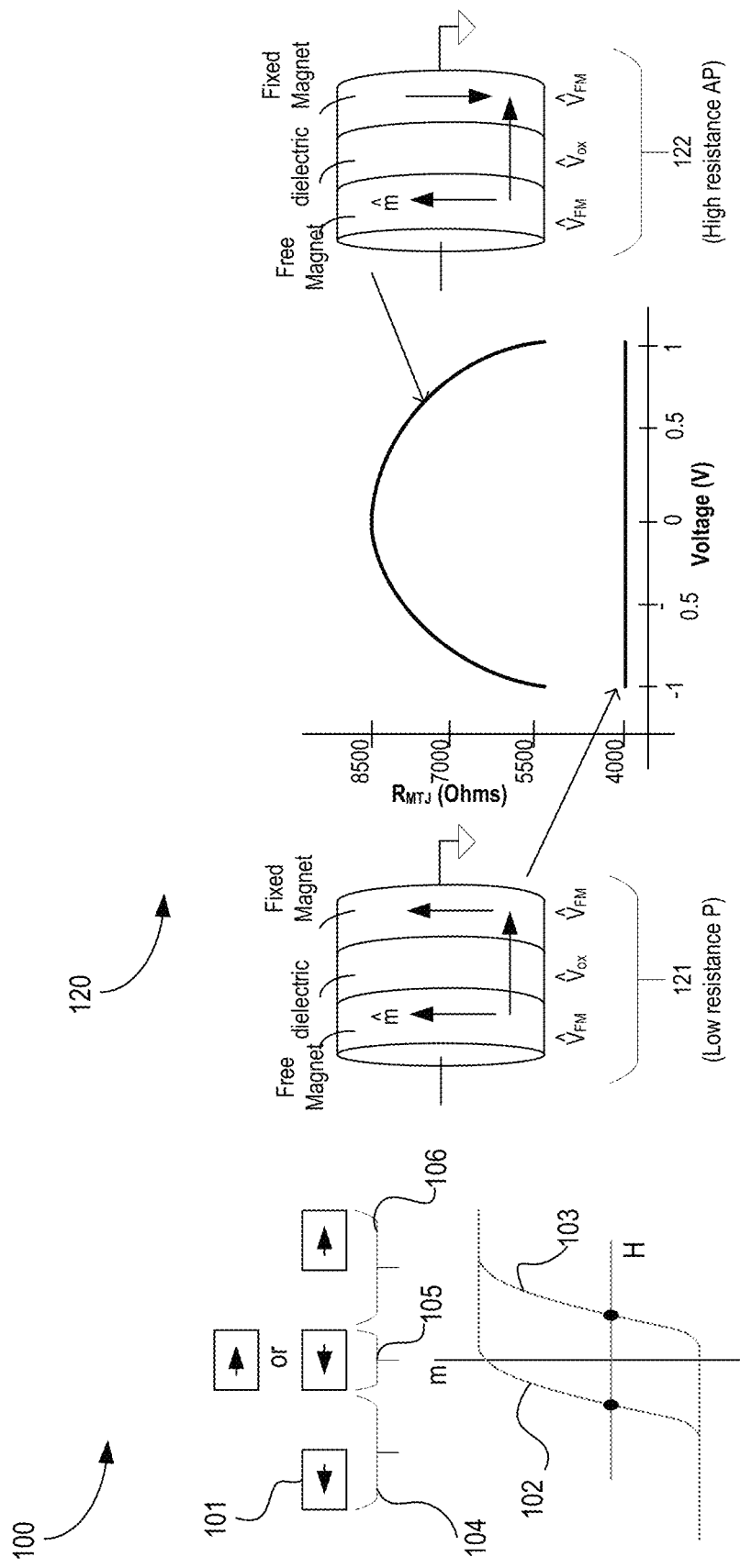
FIG. 1A illustrates a magnetization hysteresis plot 100 for a ferromagnet (FM).
FIG. 1B illustrates a Magnetic Tunneling Junction (MTJ) having FMs and with typical Tunnel Magneto Resistance (TMR) based readout of the MTJ.

One way to mitigate malicious attacks on Integrated Circuit (IC) device is to develop a handshake mechanism for authentication where a unique code is compared with a code generated by a Physical Unclonable Function (PUF). Typical PUFs use Complementary Metal Oxide Semiconductor (CMOS) Static Random Access Memory (SRAM) cell arrays or clocked cross-coupled inverters or delay chains. CMOS PUF arrays exploit device parameter mismatches and delay variations to provide the static entropy used to generate a unique code. However, such CMOS PUF arrays consume too much power and area. Also, the CMOS PUF arrays may implement costly hardening, post-processing and error correction techniques to provide adequate stability against thermal and telegraph noises, as well as voltage/temperature variations and aging induced degradations.

Some embodiments use Spin Hall Effect (SHE) magneto junction memory cells (e.g., magnetic tunneling junction (MTJ) or spin valve based memory cells) to implement high entropy PUF arrays utilizing stochastics interactions of both parameter variations of the SHE-MTJ structures as well as random thermal noises. In some embodiments, after the IC die having the PUF array is manufactured, the PUF array is first reset to 0/1 after manufacturing. Then, writing of opposite values (1/0's) is attempted for all PUF array cells by using a combination of a specific temperature and a write current level such that the switching probability of a nominal PUF array cell from 0 to 1 is 0.5 (e.g., 50%) or substantially 0.5 (e.g., substantially 50%) in the presence of thermal noise. The outcome of the stochastic write operation for a PUF array cell is governed by its write-ability characteristics dictated by process variations and the impact of thermal noise during write operation, in accordance with various embodiments. Thus, a unique signature pattern or code of 1/0's is obtained for the PUF array in each IC die. This pattern is read during the challenge/response authentications over the operational lifetime of the device, in accordance with various embodiments.

In some embodiments, the memory cell structures of the PUF array are optimized to provide adequate immunity to noise-induced retention and read failures in the presence of worst case PVT (process, voltage, and temperature) variations and aging degradations during operation, while ensuring low-energy one-time write-ability. In some embodiments, the write circuits for the PUF arrays are disabled (e.g. using a fuse or software) after the one-time write operation after IC die manufacturing. These techniques ensure that the PUF value is stable over the lifetime of the IC die across multiple authentications, in accordance with various embodiments.

There are many technical effects of the various embodiments. For example, in some embodiments, out-of-plane magnetization switching of the magnetic junction enables perpendicular magnet anisotropy (PMA) based magnetic devices (e.g., MRAM based PUF array and logic) comprising spin orbit effects that generate perpendicular spin currents. The perpendicular magnet switch of some embodiments enables low programming voltages (or higher current for identical voltages) enabled by giant spin orbit effects (GSOE) for perpendicular magnetic memory and logic. The perpendicular magnet switch, of some embodiments, results in lower write error rates which enable faster MRAM based PUFs (e.g., write time of less than 10 ns). The perpendicular magnet switch of some embodiments decouples write and read paths to enable faster read latencies. The perpendicular magnet switch of some embodiments uses significantly smaller read current through the magnetic junction (e.g., MTJ or spin valve) and provides improved reliability of the tunneling oxide and MTJs. For example, less than 10 μA compared to 100 μA for nominal write is used by the perpendicular magnet switch of some embodiments.

In various embodiments, since the PUF array is based on embedded dense non-volatile SHE-MTJ cells that can be fabricated in the metal layers above silicon, its static power and cell area are much smaller than CMOS SRAM cells or clocked cross-coupled inverters or delay chains. As a result, the PUF array of various embodiments provides much higher static entropy per unit area leading to higher resistance against machine learning attacks and more efficient implementation. The PUF value from the PUF array is more robust against voltage and temperature variations, thus providing higher stability. Similar PUF arrays can be implemented using Spin Transfer Torque (STT) Magneto Tunneling Junction (MTJ) memory cells but the SHE-MTJ memory may offer much lower write current and more independent write-ability control that may lead to a superior PUF array implementation. Other technical effects are evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within+/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

For the purposes of present disclosure, the terms "spin" and "magnetic moment" are used equivalently. More rigorously, the direction of the spin is opposite to that of the magnetic moment, and the charge of the particle is negative (such as in the case of electron).

The term "free" or "unfixed" here with reference to a magnet refers to a magnet whose magnetization direction can change along its easy axis upon application of an external field or force (e.g., Oersted field, spin torque, etc.). Conversely, the term "fixed" or "pinned" here with reference to a magnet refers to a magnet whose magnetization direction is pinned or fixed along an axis and which may not change due to application of an external field (e.g., electrical field, Oersted field, spin torque,).

Here, perpendicularly magnetized magnet (or perpendicular magnet, or magnet with perpendicular magnetic anisotropy (PMA)) refers to a magnet having a magnetization which is substantially perpendicular to a plane of the magnet or a device. For example, a magnet with a magnetization which is in a z-direction in a range of 90 (or 270) degrees+/− 20 degrees relative to an x-y plane of a device.

Here, an in-plane magnet refers to a magnet that has magnetization in a direction substantially along the plane of the magnet. For example, a magnet with a magnetization which is in an x or y direction and is in a range of 0 (or 180 degrees)+/−20 degrees relative to an x-y plane of a device.

The term "device" may generally refer to an apparatus according to the context of the usage of that term. For example, a device may refer to a stack of layers or structures, a single structure or layer, a connection of various structures having active and/or passive elements, etc. Generally a device is a three dimensional structure with a plane along the x-y direction and a height along the z direction of an x-y-z Cartesian coordinate system. The plane of the device may also be the plane of an apparatus which comprises the device.

It is pointed out that those elements of the figures having the same reference numbers (or names) as the elements of any other figure can operate or function in any manner similar to that described, but are not limited to such.

FIG. 1A illustrates a magnetization hysteresis plot 100 for ferromagnet 101. The plot shows magnetization response to an applied magnetic field for ferromagnet 101. The x-axis of plot 100 is magnetic field 'H' while the y-axis is magnetization 'm'. For ferromagnet (FM) 101, the relationship between 'H' and 'm' is not linear and results in a hysteresis loop as shown by curves 102 and 103. The maximum and minimum magnetic field regions of the hysteresis loop correspond to saturated magnetization configurations 104 and 106, respectively. In saturated magnetization configurations 104 and 106, FM 101 has stable magnetizations. In the zero-magnetic field region 105 of the hysteresis loop, FM 101 does not have a definite value of magnetization, but rather depends on the history of applied magnetic fields. For example, the magnetization of FM 101 in configuration 105 can be either in the +x direction or the −x direction for an in-plane FM. As such, changing or switching the state of FM 101 from one magnetization direction (e.g., configuration 104) to another magnetization direction (e.g., configuration 106) may be time consuming. The FM response time is associated with the intrinsic energy of switching proportional to the area in the graph contained between curves 102 and 103.

FIG. 1B illustrates a system 120 showing a typical Tunnel Magneto Resistance (TMR) based readout of a Magnetic Tunneling Junction (MTJ) 100 using ferromagnets. In one example, MTJ 121/122 comprises stacking a FM layer (e.g., Free Magnet) with a tunneling dielectric (e.g., MgO or $Al_2O_3$) and another FM layer (e.g., Fixed or pinned Magnet). The plot in the center illustrates the dependence of resistance ($R_{MTJ}$) on voltage across MTJ 121/122 for the two magnetization directions of the Free Magnet relative to the Fixed Magnet, where resistance is in Ohms and voltage is in Volts. Here, MTJ 121 illustrates the low resistance state where the magnetization of the Free Magnet is in the same direction as the magnetization of the Fixed Magnet (e.g., the directions of magnetizations are parallel (P) to each other). MTJ 122 illustrates the high resistance state where the direction of magnetization of the Free Magnet is in the opposite direction as the direction of magnetization of the Fixed Magnet (e.g., the directions of magnetizations are anti-parallel (AP) to each other).

Here, the read out of the magnetization is obtained via sensing of a resistance change across MTJ 121/122 on the order of 4 k Ohms (which in this example translates to a voltage of 40 mV to 80 mV at 10 µA read current). In this example, 10 ρA of read current limits the total read time from 5 ns to 10 ns, which is slow. As such, the TMR based read out of MTJs 121/122 is highly limited in the signal strength and speed it can generate.

FIGS. 2A-B illustrate a three-dimensional (3D) view 200 and corresponding top view 220, respectively, of device having an out-of-plane magnetic junction stack coupled to a spin orbit coupling (SOC) interconnect, where the magnetic junction stack includes a free magnet layer much smaller than a length of the SOC interconnect.

Here, the stack of layers having magnetic junction 221 is coupled to an electrode 222 comprising spin Hall effect (SHE) or SOC material, where the SHE material converts charge current $I_w$ (or write current) to spin polarized current $I_s$. The device of FIG. 2A forms a three-terminal memory cell with SHE induced write mechanism and MTJ based read-out. The device of FIG. 2A comprises magnetic junction 221, SHE Interconnect or electrode 222, and non-magnetic metal(s) 223a/b. In one example, MTJ 221 comprises layers 221a, 221b, and 221c. In some embodiments, layers 221a and 221c are ferromagnetic layers. In some embodiments, layer 221b is a metal or a tunneling dielectric. The three terminals of the magnetic device are 233a, 223b, and 221g.

For example, when the magnetic junction is a spin valve, layer 221b is metal or a metal oxide (e.g., a non-magnetic metal such as Al and/or its oxide) and when the magnetic junction is a tunneling junction, then layer 221b is a dielectric (e.g. MgO etc.). One or both ends along the horizontal direction of SHE Interconnect 222 is formed of non-magnetic metals 223a/b. Additional layers 221d, 221e, 221f, and 221g can also be stacked on top of layer 221c. In some embodiments, layer 221g is a non-magnetic metal electrode.

So as not to obscure the various embodiments, the magnetic junction is described as an MTJ. However, the embodiments are also applicable for spin valves. A wide combination of materials can be used for material stacking of magnetic junction 221. For example, the stack of layers 221a, 221b, 221c, 221d, 221e, 221f, and 221g are formed of materials which include: $Co_xFe_yB_z$, MgO, $Co_xFe_yB_z$, Ru, $Co_xFe_yB_z$, IrMn, and Ru, respectively, where 'x,' 'y,' and 'z' are fractions of elements in the alloys. Other materials may also be used to form MTJ 221. MTJ 221 stack comprises free magnetic layer 221a, tunneling oxide 221b (e.g., MgO, $Al_2O_3$), a fixed magnetic layer 221c/d/e which is a combination of CoFe, Ru, and CoFe layers, respectively, referred to as Synthetic Anti-Ferromagnet (SAF), and an Anti-Ferromagnet (AFM) layer 221f. The SAF layer has the property, that the magnetizations in the two CoFe layers are opposite, and allows for cancelling the dipole fields around the free magnetic layer such that a stray dipole field will not control the free magnetic layer. In some embodiments, AFM layer 221f is a quasi-two-dimensional triangular AFM including $Ni_{(1-x)}M_xGa_2S_4$, where 'M' includes one of: Mn, Fe, Co or Zn.

In some embodiments, the free and fixed magnetic layers (221a and 221c, respectively) are formed of CFGG (i.e., Cobalt (Co), Iron (Fe), Germanium (Ge), or Gallium (Ga) or a combination of them). In some embodiments, FM 221a/c are formed from Heusler alloys. Heusler alloys are ferromagnetic metal alloys based on a Heusler phase. Heusler phases are intermetallic with certain composition and face-centered cubic crystal structure. The ferromagnetic property of the Heusler alloys are a result of a double-exchange mechanism between neighboring magnetic ions. In some embodiments, the Heusler alloy includes one of: $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$ $Co_2MnAl$, $Co_2MnSi$, $Co_2MnGa$, $Co_2MnGe$, $Pd_2MnAl$, $Pd_2MnIn$, $Pd_2MnSn$, $Pd_2MnSb$, $Co_2FeSi$, $Co_2FeAl$, $Fe_2VAl$, $Mn_2VGa$, $Co_2FeGe$, MnGa, or MnGaRu.

In some embodiments, fixed magnet layer 221c is a magnet with perpendicular magnetic anisotropy (PMA). In some embodiments, the magnet with PMA comprises a stack of materials, wherein the materials for the stack are selected from a group consisting of: Co and Pt; Co and Pd; Co and Ni; MgO, CoFeB, Ta, CoFeB, and MgO; MgO, CoFeB, W, CoFeB, and MgO; MgO, CoFeB, V, CoFeB, and MgO; MgO, CoFeB, Mo, CoFeB, and MgO; $Mn_xGa_y$; Materials with $L1_0$ symmetry; and materials with tetragonal crystal structure. In some embodiments, the magnet with PMA is formed of a single layer of one or more materials. In some embodiments, the single layer comprises Mn and Ga (e.g., MnGa).

$L1_0$ is a crystallographic derivative structure of a FCC (face centered cubic lattice) structure and has two of the faces occupied by one type of atom and the corner and the other face occupied with the second type of atom. When phases with the $L1_0$ structure are ferromagnetic, the magnetization vector usually is along the [0 0 1] axis of the crystal. Examples of materials with $L1_0$ symmetry include CoPt and FePt. Examples of materials with tetragonal crystal structure and magnetic moment are Heusler alloys such as CoFeAl, MnGe, MnGeGa, and MnGa.

In some embodiments, SHE Interconnect 222 (or the write electrode) includes one or more of β-Tantalum (β-Ta), Ta, β-Tungsten (β-W), W, Pt, Copper (Cu) doped with elements such as Iridium, Bismuth and any of the elements of 3d, 4d, 5d and 4f, 5f periodic groups in the Periodic Table which may exhibit high spin orbit coupling. In some embodiments, SHE interconnect 222 comprises a spin orbit material which includes one or more of: graphene, $TiS_2$, $WS_2$, $MoS_2$, $TiSe_2$, $WSe_2$, $MoSe_2$, $B_2S_3$, $Sb_2S_3$, $Ta_2S$, $Re_2S_7$, $LaCPS_2$, $LaOAsS_2$, $ScOBiS_2$, $GaOBiS_2$, $AlOBiS_2$, $LaOSbS_2$, $BiOBiS_2$, $YOBiS_2$, $InOBiS_2$, $LaOBiSe_2$, $TiOBiS_2$, $CeOBiS_2$, $PrOBiS_2$, $NdOBiS_2$, $LaOBiS_2$, or $SrFBiS_2$. In some embodiments, the SHE interconnect 222 comprises spin orbit material which includes one of a 2D material or a 3D material, wherein the 3D material is thinner than the 2D material. In some embodiments, the SHE interconnect 222 comprises a spin orbit material which includes materials that exhibit Rashba-Bychkov effect. In some embodiments, SHE Interconnect 222 transitions into high conductivity non-magnetic metal(s) 223a/b to reduce the resistance of SHE Interconnect 222. The non-magnetic metal(s) 223a/b include one or more of: Cu, Co, α-Ta, Al, CuSi, or NiSi.

In one case, the magnetization direction of fixed magnetic layer 221c is perpendicular relative to the magnetization direction of free magnetic layer 221a (e.g., magnetization directions of the free and fixed magnetic layers are not parallel, rather they are orthogonal). For example, the magnetization direction of the free magnetic layer 221a is in-plane while the magnetization direction of fixed magnetic layer 221c is perpendicular to the in-plane. In another case, the magnetization direction of the fixed magnetic layer 221a is in-plane while the magnetization direction of the free magnetic layer 221c is perpendicular to the plane of the device.

The thickness of a ferromagnetic layer (e.g., fixed or free magnetic layer) may determine its equilibrium magnetization direction. For example, when the thickness of the ferromagnetic layer 221a/c is above a certain threshold (depending on the material of the magnet, e.g. approximately 1.5 nm for CoFe), then the ferromagnetic layer exhibits magnetization direction which is in-plane. Likewise, when the thickness of the ferromagnetic layer 221a/c is below a certain threshold (depending on the material of the magnet), then the ferromagnetic layer 221a/c exhibits magnetization direction which is perpendicular to the plane of the magnetic layer.

Other factors may also determine the direction of magnetization. For example, factors such as surface anisotropy (depending on the adjacent layers or a multi-layer composition of the ferromagnetic layer) and/or crystalline anisotropy (depending on stress and the crystal lattice structure modification such as FCC (face centered cubic lattice), BCC (body centered cubic lattice), or $L1_0$-type of crystals, where $L1_0$ is a type of crystal class which exhibits perpendicular magnetizations), can also determine the direction of magnetization.

In some embodiments, free magnet 221a is a structure which comprises a stack of layers or structures including a first free magnet, a second free magnet, and a coupling layer or structure between the first and second free magnets. In some embodiments, the first free magnet of the free magnet structure 221a is adjacent to the SHE interconnect or electrode 222. In various embodiments, the first and second free magnets of the free magnet structure 221a comprise CFGG. In some embodiments, the first and second free magnets of the free magnet structure 221a are formed from Heusler alloys. In some embodiments, the coupling layer includes one or more of: Ru, Os, Hs, Fe, or other transition metals from the platinum group of the periodic table.

In some embodiments, the fixed magnet 221c is a structure which comprises a stack of layers or structures including a first fixed magnet, a second fixed magnet, and a coupling layer between the first and second fixed magnets. In some embodiments, the first fixed magnet of the fixed magnet structure 221c is adjacent to the dielectric layer 221b while the second fixed magnet is part of or is adjacent to the AFM. In various embodiments, the first and second fixed magnets of the fixed magnet structure 221c comprise CFGG. In some embodiments, the first and second fixed magnets of the fixed magnet structure 221c are formed from Heusler alloys. In some embodiments, the coupling layer includes one or more of: Ru, Os, Hs, Fe, or other transition metals from the platinum group of the periodic table.

In some embodiments, the applied current $I_w$ is converted into spin current $I_s$ by SHE Interconnect 222 (also referred to as the spin orbit coupling interconnect). This spin current switches the direction of magnetization of the free layer and thus changes the resistance of MTJ 221. However, to read out the state of MTJ 221, a sensing mechanism is used to sense the resistance change.

The memory device of FIG. 2A further includes bit-line (BL) 202, first select device 201 (e.g., n-type transistor), word-lines (WL) 203 and 207, first select line 204, second select line 205, and second select device 206 (e.g., n-type transistor). The magnetic cell is written by applying a charge current via SHE Interconnect 222 through the first and second select devices 201, 206. In some embodiments, one or more memory cells of an array are selected for writing by turning on one or more of the access devices 201/206 via word-lines 203/207. A pulse of current is then passed through the SHE interconnect 222 via the select lines 204, 205.

The direction of the magnetic writing in free magnet layer 221a is decided by the direction of the applied charge current. Positive currents (e.g., currents flowing in the +y direction) produce a spin injection current with transport direction (along the +z direction) and spins pointing to the +x direction. The injected spin current in turn produces spin torque to align the free magnet 221a (coupled to the SHE layer 222 of SHE material) in the +x direction. Negative currents (e.g., currents flowing in the −y direction) produce a spin injection current with transport direction (along the +z direction) and spins pointing to the −x direction. The injected spin current in-turn produces spin torque to align the free magnet 221a (coupled to the SHE material of layer 222) in the −x direction. In some embodiments, in materials with the opposite sign of the SHE/SOC effect, the directions of spin polarization and thus of the free layer magnetization alignment are reversed compared to the above.

Data stored in the memory device of FIG. 2A is read using the phenomena of TMR. Depending on the magnetization of the free magnet 221a relative to the fixed or reference magnet 221c, the magnetic junction exhibits high or low resistance. This resistance is sensed by the voltage and/or current on bit-line 202.

When a write current $I_w$ of certain amplitude and duration is passed through the SHE electrode 222, the write current $I_w$ creates spin orbit torque at the interface of SHE electrode 222 and free magnet 221a. If the torque is sufficiently high (e.g., the write current amplitude and pulse width are larger than a threshold), then the magnetic orientation of the free magnet 221a reverses relative to its previous magnetic orientation. This is due to Spin Hall Effect (SHE). If the free magnet 221a and fixed magnet 221c have the same orientation, the resistance of MTJ 221 is low. If the free magnet 221a and fixed magnet 221c have opposite orientations, then the resistance of MTJ 221 is high. The resistance of MTJ 221 is sensed by readout circuits by sensing current across the MTJ. The probability of the magnetic orientation switching of free layer 221a due to write current $I_w$ in the SHE electrode 222 depends on the write pulse width and amplitude as well as thermal noise. The probability of the magnetic orientation switching of free layer 221a also depends on the MTJ structure and volume. Generally, higher volume ends up using larger write currents.

Some embodiments describe a physically unclonable function (PUF) array that uses memory cells with a highly efficient transduction method and associated apparatus for converting spin currents to charge currents and then back to spin currents. In some embodiments, Spin Orbit Coupling (e.g., Spin Hall Effect) is used for these PUF array memory cells for transduction from both magnet state to current and back. Spin Orbit Coupling is more efficient switching mechanism for transduction from the magnetization direction to current and for switching magnetization.

FIG. 2C illustrates plot 230 showing stochastic writ behavior of the MTJ of FIG. 2A as a function of write current amplitude and pulse width. Here, x-axis is current in micro Amperes (μA), and the y-axis is switching probability (between 0 and 1). Three waveforms are shown in plot 230-231, 232, and 233. Waveform 231 represents the switching probability of free magnet 221a when the pulse width of current $I_w$ is 1.0 nS (nanoseconds), waveform 232 represents the switching probability of free magnet 221a when the pulse width of current $I_w$ is 0.5 nS, and waveform 233 illustrates the switching probability of free magnet 221a when the pulse width of current $I_w$ is 0.2 nS. The probability of the magnetic orientation switching of free layer 221a due to write current $I_w$ in the SHE electrode 222 depends on the write pulse width and amplitude as well as thermal noise.

Figure 3:
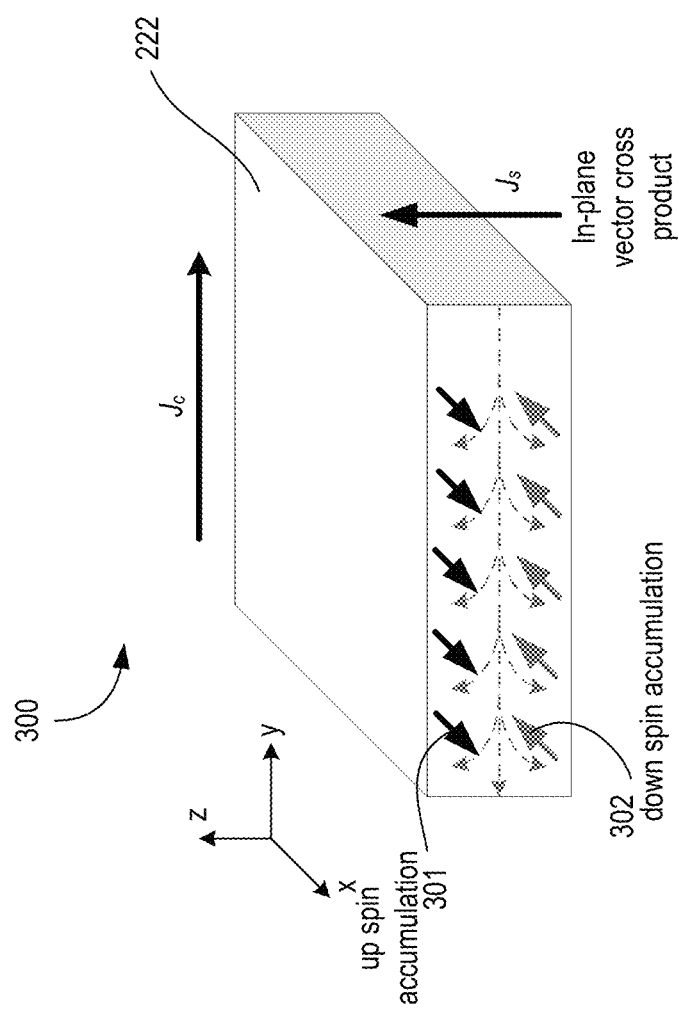
FIG. 3 illustrates a cross-section of the SOC interconnect with electrons having their spins polarized in-plane and deflected up and down resulting from a flow of charge current.

FIG. 3 illustrates cross-section 300 of the SOC interconnect 222 with electrons having their spins polarized in-plane and deflected up and down resulting from a flow of charge current. In this example, positive charge current represented by $J_c$ produces spin-front (e.g., in the +x direction) polarized current 301 and spin-back (e.g., in the -x direction) polarized current 302. The injected spin current $\vec{I}_s$ generated by a charge current $\vec{I}_c$ in the write electrode 222 is given by:

$$\vec{I}_s = P_{SHE}(w,t,\lambda_{sf},\theta_{SHE})(\vec{I}_c \times \hat{z}) \quad (1)$$

where, the vector of spin current $\vec{I}_s = \vec{I}_\uparrow - \vec{I}_\downarrow$ points in the direction of transferred magnetic moment and has the magnitude of the difference of currents with spin along and opposite to the spin polarization direction, $\hat{z}$ is the unit vector perpendicular to the interface, $P_{SHE}$ is the spin Hall injection efficiency which is the ratio of magnitude of transverse spin current to lateral charge current, w is the width of the magnet, t is the thickness of the SHE Interconnect (or write electrode) 222, $\lambda_{sf}$ is the spin flip length in SHE Interconnect 222, $\theta_{SHE}$ is the spin Hall angle for SHE Interconnect 222 to free ferromagnetic layer interface. The injected spin angular momentum responsible for the spin torque given by:

$$\vec{S} = \hbar \vec{I}_s / 2e \quad (2)$$

The generated spin up and down currents 301/302 (e.g., $\vec{J}_s$) are described as a vector cross-product given by:

$$\vec{J}_s = \theta_{SHE}(\vec{J}_c \times \hat{z}) \quad (3)$$

Figure 4B:
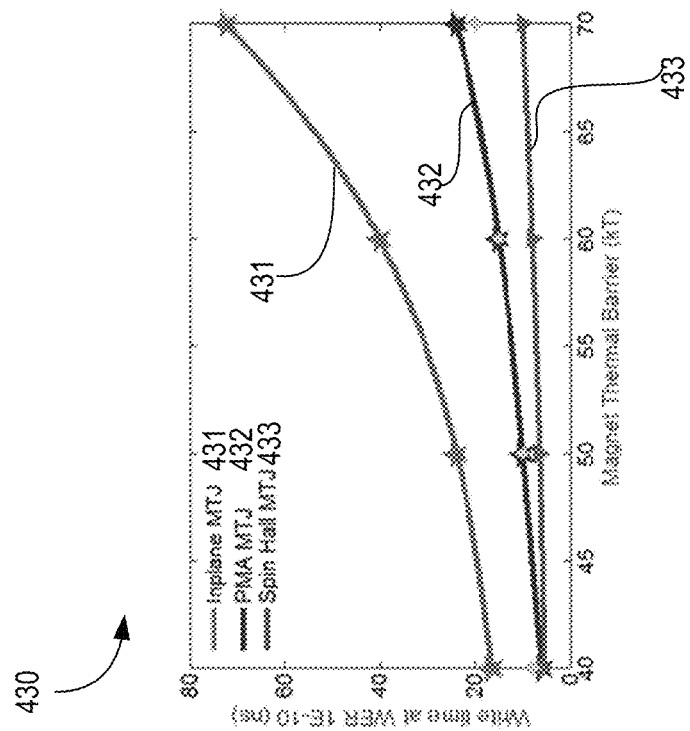
FIG. 4B illustrates a plot comparing reliable write times for spin Hall MRAM and spin torque MRAM.
Figure 4A:
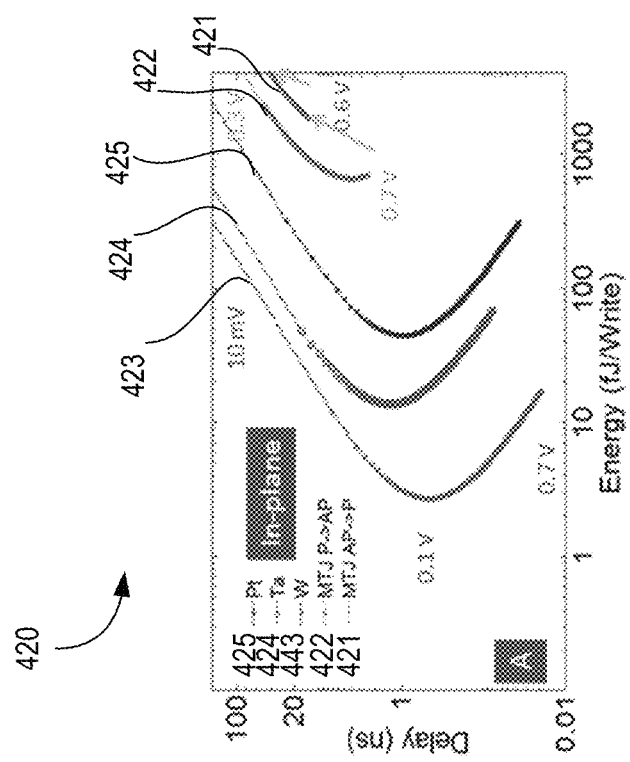
FIG. 4A illustrates a plot showing write energy-delay conditions for one transistor and one MTJ with spin Hall effect (SHE) material compared to traditional MTJs.

FIG. 4A illustrates plot 420 showing write energy-delay conditions for one transistor and one MTJ with SHE material compared to traditional MTJs. FIG. 4B illustrates plot 430 showing write energy-delay conditions for one transistor and one MTJ with SHE material compared to traditional MTJs. Here, x-axis is energy per write operation in femto-Joules (fJ) while the y-axis is delay in nano-seconds (ns).

In this example, the energy-delay trajectory of SHE and MTJ devices are compared for in-plane magnet switching as the applied write voltage is varied. The energy-delay relationship (for in-plane switching) can be written as:

$$E(\tau) = R_{write} I_{co}^2 \frac{\left(\tau + \tau_0 \ln\left(\frac{\pi}{2\theta_0}\right)\right)^2}{\tau} = \frac{4}{\hbar^2} \frac{R_{write}}{P^2} \frac{1}{\tau}\left(\mu_0 e\alpha \frac{M_s}{2}\left(\tau + \tau_0 \ln\left(\frac{\pi}{2\theta_0}\right)\right)^2\right)W$$

where $R_{write}$ is the write resistance of the device (resistance of SHE electrode or resistance of MTJ-P or MTJ-AP, where MTJ-P is a MTJ with parallel magnetizations while MTJ-AP is an MTJ with anti-parallel magnetizations, $\mu_0$ is vacuum permeability, e is the electron charge. The equation shows that the energy at a given delay is directly proportional to the square of the Gilbert damping $\alpha$. Here the characteristic time, $\tau_0 = M_s Ve/I_c P\mu_B$ varies as the spin polarization varies for various SHE metal electrodes (e.g., 423, 424, 425). Plot 420 shows five curves 421, 422, 423, 424, and 425. Curves 421 and 422 show write energy-delay conditions using traditional MTJ devices without SHE material.

For example, curve 421 shows the write energy-delay condition caused by switching a magnet from anti-parallel (AP) to parallel (P) state, while curve 422 shows the write energy-delay condition caused by switching a magnet from P to AP state. Curves 422, 423, and 424 show write energy-delay conditions of an MTJ with SHE material. Clearly, write energy-delay conditions of an MTJ with SHE material is much lower than the write energy-delay conditions of an MTJ without SHE material. While the write energy-delay of an MTJ with SHE material improves over a traditional MTJ without SHE material, further improvement in write energy-delay is desired.

FIG. 4B illustrates plot 430 comparing reliable write times for spin Hall MRAM and spin torque MRAM. There are three cases considered in plot 430. Waveform 431 is the write time for in-plane MTJ, waveform 432 is the write time for PMA MTJ, and waveform 433 is the write time for spin Hall MTJ. The cases considered here assume a 30×60 nm magnet with 40 kT energy barrier and 3.5 nm SHE electrode thicknesses. The energy-delay trajectories of the devices are obtained assuming a voltage sweep from 0 V to 0.7 V in accordance to voltage restrictions of scaled CMOS. The energy-delay trajectory of the SHE-MTJ devices exhibits broadly two operating regions A) Region 1 where the energy-delay product is approximately constant ($\tau_d < M_s Ve/I_c P\mu_B$), B), and Region 2 where the energy is proportional to the delay $\tau_d > M_s Ve/I_c P\mu_B$. The two regions are separated by energy minima at $\tau_{opt} = M_s Ve/I_c P\mu_B$ where minimum switching energy is obtained for the spin torque devices.

The energy-delay trajectory of the STT-MTJ (spin transfer torque MTJ) devices is limited with a minimum delay of 1 ns for in-plane devices at 0.7 V maximum applied voltage, the switching energy for P-AP and AP-P are in the range of 1 pJ/write. In contrast, the energy-delay trajectory of SHE-MTJ (in-plane anisotropy) devices can enable switching times as low as 20 ps (β-W with 0.7 V, 20 fJ/bit) or switching energy as small as 2 fJ (β-W with 0.1 V, 1.5 ns switching time).

Figure 5A:
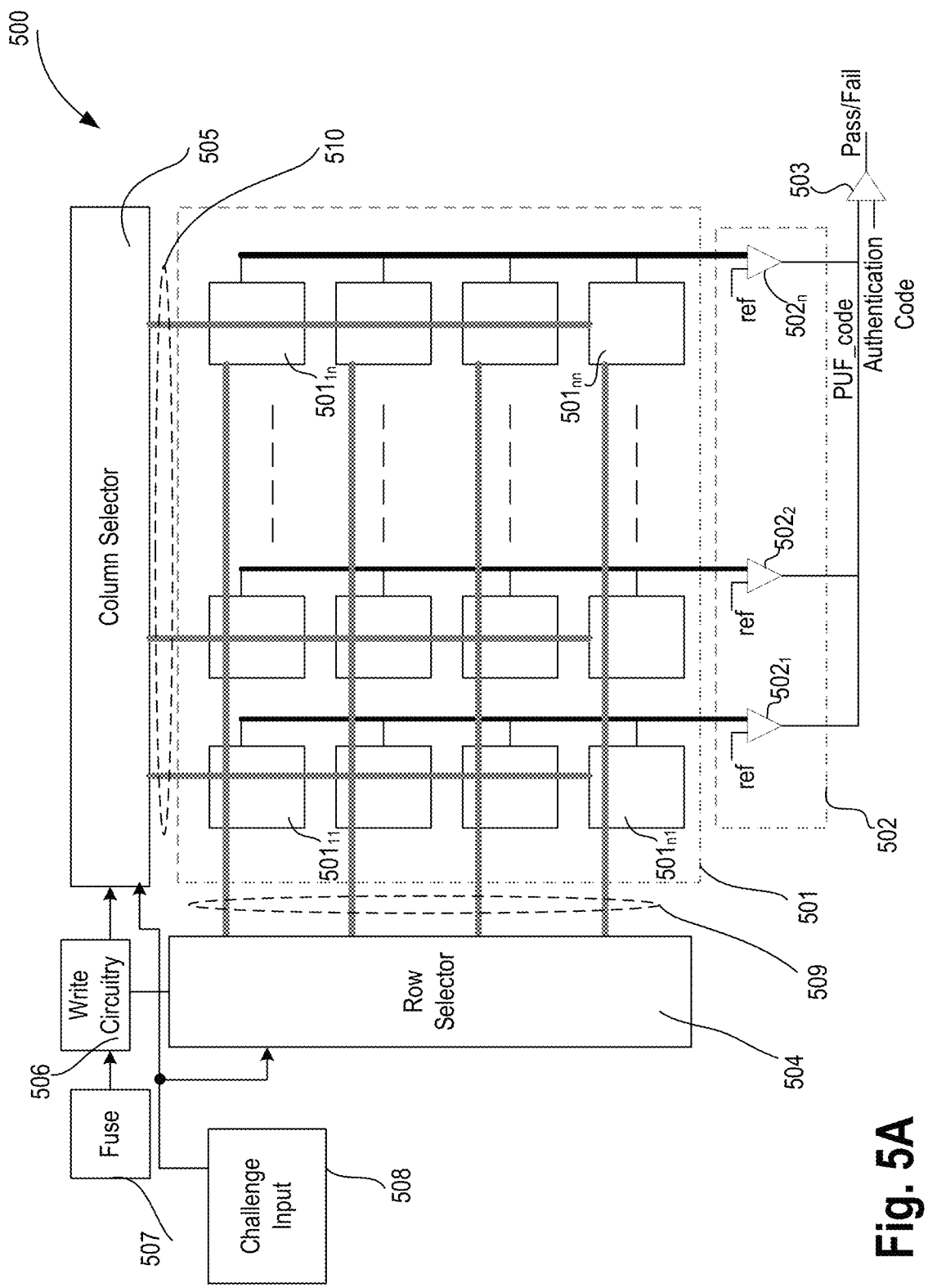
FIGS. 5A-B illustrate apparatuses comprising an array of physically unclonable function (PUF) magnetic memory cells to generate a unique code for authentication, in accordance with some embodiments.

FIG. 5A illustrates apparatus 500 comprising an array 501 of PUF magnetic memory cells $501_{11}$ to $501_{nn}$, where 'n' is an integer greater than 2, to generate a unique code for authentication, in accordance with some embodiments. In some embodiments, apparatus 500 also comprises a sensing circuitry 502 to sense data stored in array 501 and to compare that data relative to a reference, ref, (e.g., voltage current or voltage) to generate a code (referred to as PUF_code). In some embodiments, sensing circuitry 502 comprises a plurality of amplifiers $502_{1-n}$ where 'n' is an integer. The number of amplifiers depends on the number of columns or rows of memory cell in array 501. In some embodiments, apparatus 500 comprises a comparator 503 (e.g., clocked comparator or an asynchronous comparator) to compare the code PUF_code from the sensor circuitry 502 with an Authentication Code. If the Authentication code matches with the PUF_code, then the output of comparator 502 indicates a Pass (e.g., logic 1), and if the Authentication code does not match with the PUF_code, then the output of comparator 502 indicates a Fail (e.g., logic 0). In some embodiments, the Authentication Code is stored in a non-volatile memory off chip. For example, the Authentication Code is stored in a server or cloud and downloaded from there to compare with the PUF_code to ascertain authentication of the IC device having the PUF array.

The resistance of an MTJ cell (e.g., cell $501_{11}$) or magnetic orientation of the free layer 221a of that cell can be disturbed by thermal noise in retention state and read current during cell read out. In various embodiments, the MTJ structure of cells of PUF array 501 is designed to be sufficiently stable. For example, the magnetic orientation of the free layer 221a of the cell is retained at the end of a previous write operation, across worst case temperature and process induced material/dimensional variations, when no operations are performed on the MTJ cell.

In some embodiments, the read current (Iread) and read circuits (e.g., sensing circuitry 502) are designed to ensure that the magnetic orientation of free layer 221a of the memory cells of the PUF array does not change for repeated read operations, again providing stability of the stored value at the end of the previous write operation. These are some of the techniques used to ensure stability of the PUF array value (e.g., PUF_code) during its operational lifetime, in accordance with some embodiments. However, other mechanisms currently known or later developed can be used to ensure stability of the PUF array value (e.g., PUF_code).

In some embodiments, apparatus 500 comprises Row Selector 504 and Column Selector 505 that can be used to provide bias voltage(s) to word-line (WL) and/or select lines (SL1 and/or SL2) to select memory cells in array 501 for writing and/or reading. In some embodiments, apparatus 500 comprises Write Circuitry 506 which provides a code or data for writing into array 501 according to cells selected by Row and Select Selectors 504 and 505, respectively. For example, select lines 509 and word-lines 510 are provided by selectors 504 and 505, respectively, to select the memory cells for read or write operations. In some embodiments, apparatus 500 comprises a Fuse circuitry 507 to disable Write Circuitry 506 after data is stored in array 501. In some embodiments, apparatus 500 comprises a challenge input circuitry 508 that provides the data for storing into array 501. In some embodiments, the challenge input circuitry 508 provides an address for fetching data from array 501, and this data is then stored in a non-volatile memory as a signature of the IC die having that PUF array 501.

Figure 5B:
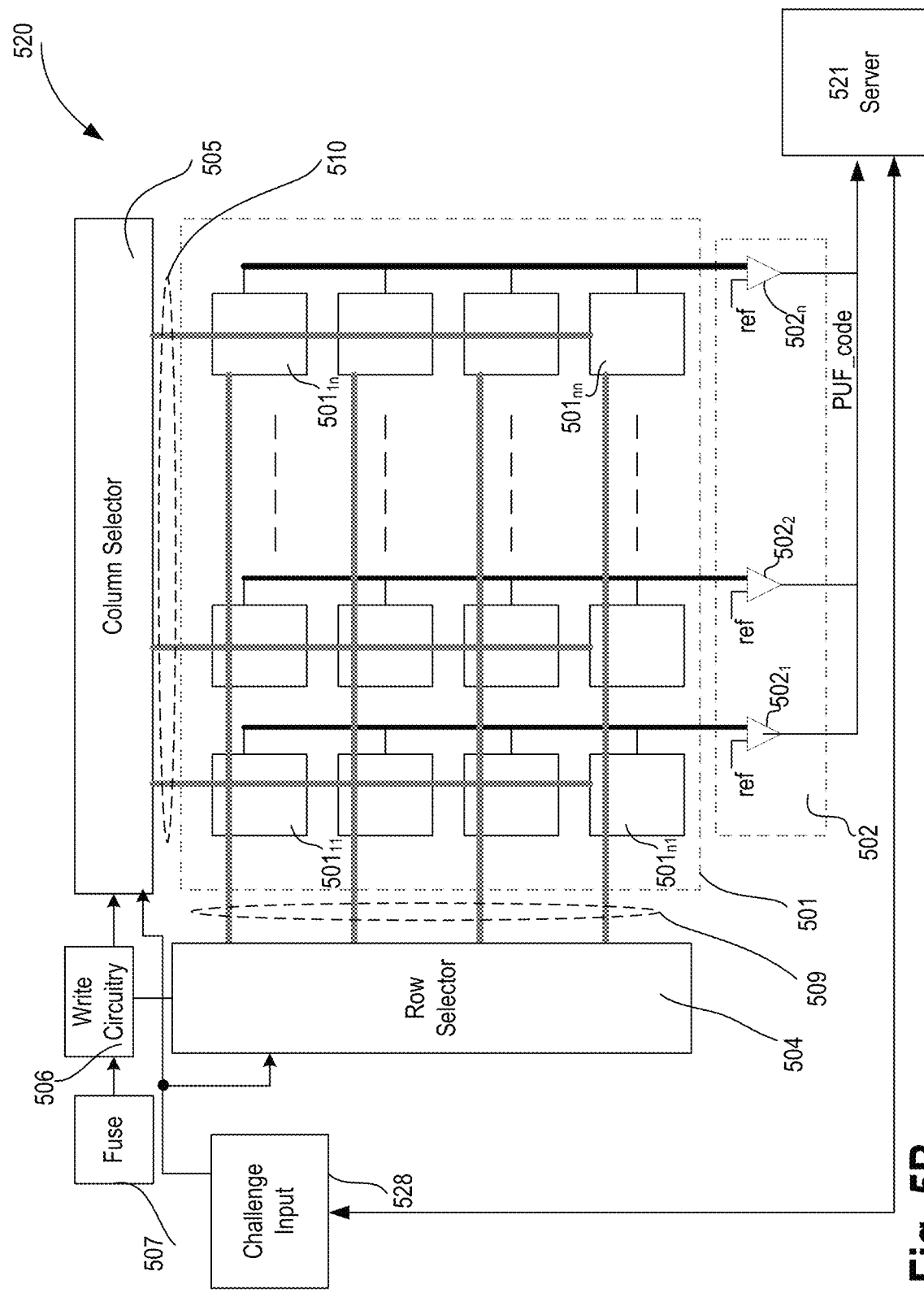

FIG. 5B illustrates apparatus 520 which interacts with a server for authentication, in accordance with some embodiments. Apparatus 520 of FIG. 5B is similar to the apparatus of FIG. 5A but for server 521 and modified Challenge Input circuitry 528. In some embodiments, the PUF_code can be sent to an authentication or certification server system 521 where the system identification (ID) and its corresponding correct challenge-response pairs have been previously stored during a secure enrolment process for the system following the one-time PUF array programming (e.g., write), before releasing the system in the field for operation. In some embodiments, the previously stored challenge-response pairs are stored by Challenge Input circuitry 528 into Server 521 or another non-volatile memory (not shown).

Figures 6A, 6B:
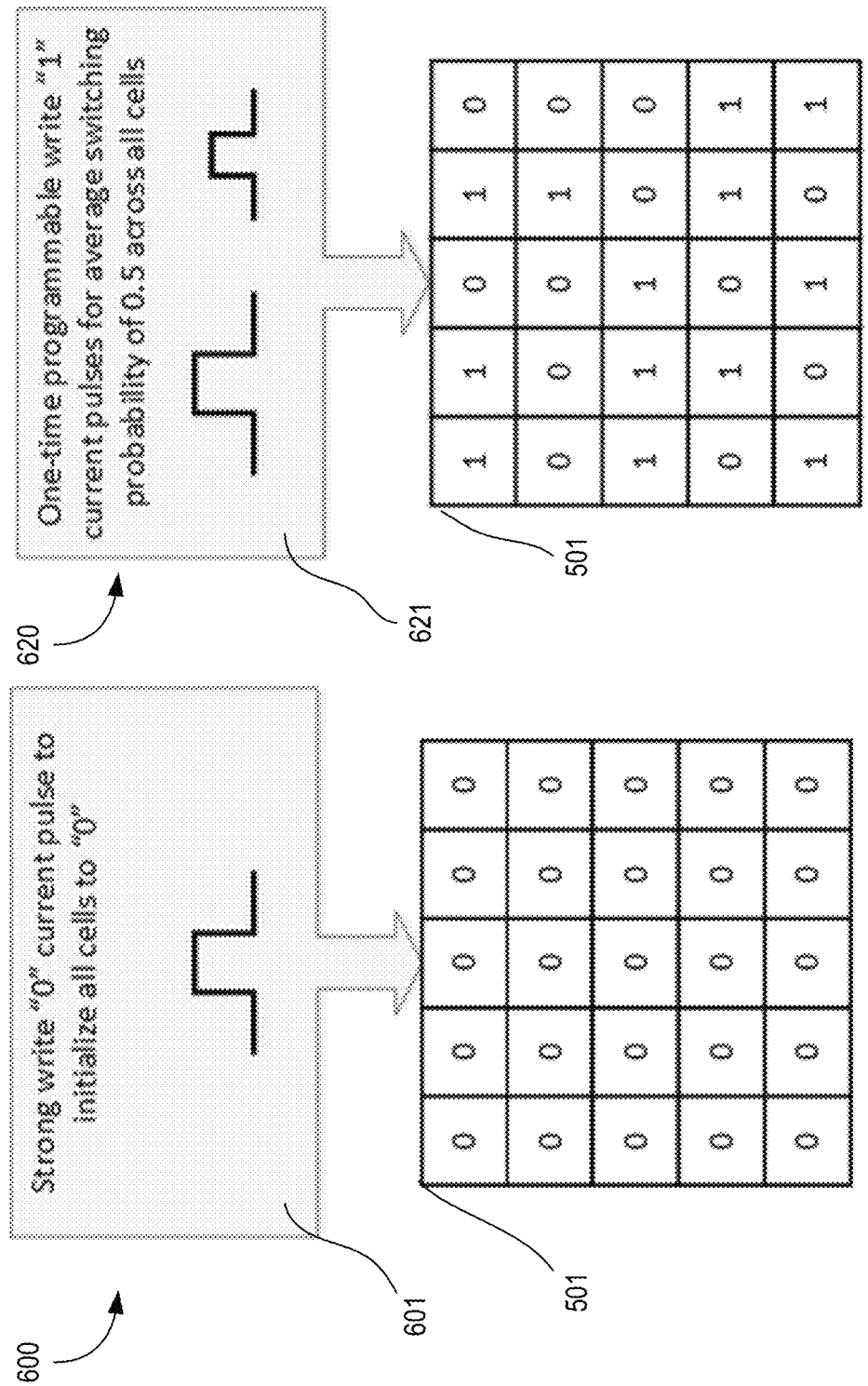
FIGS. 6A-C illustrate a process to generate a unique code from the array of PUF magnetic memory cells, in accordance with some embodiments.
Figure 6C:
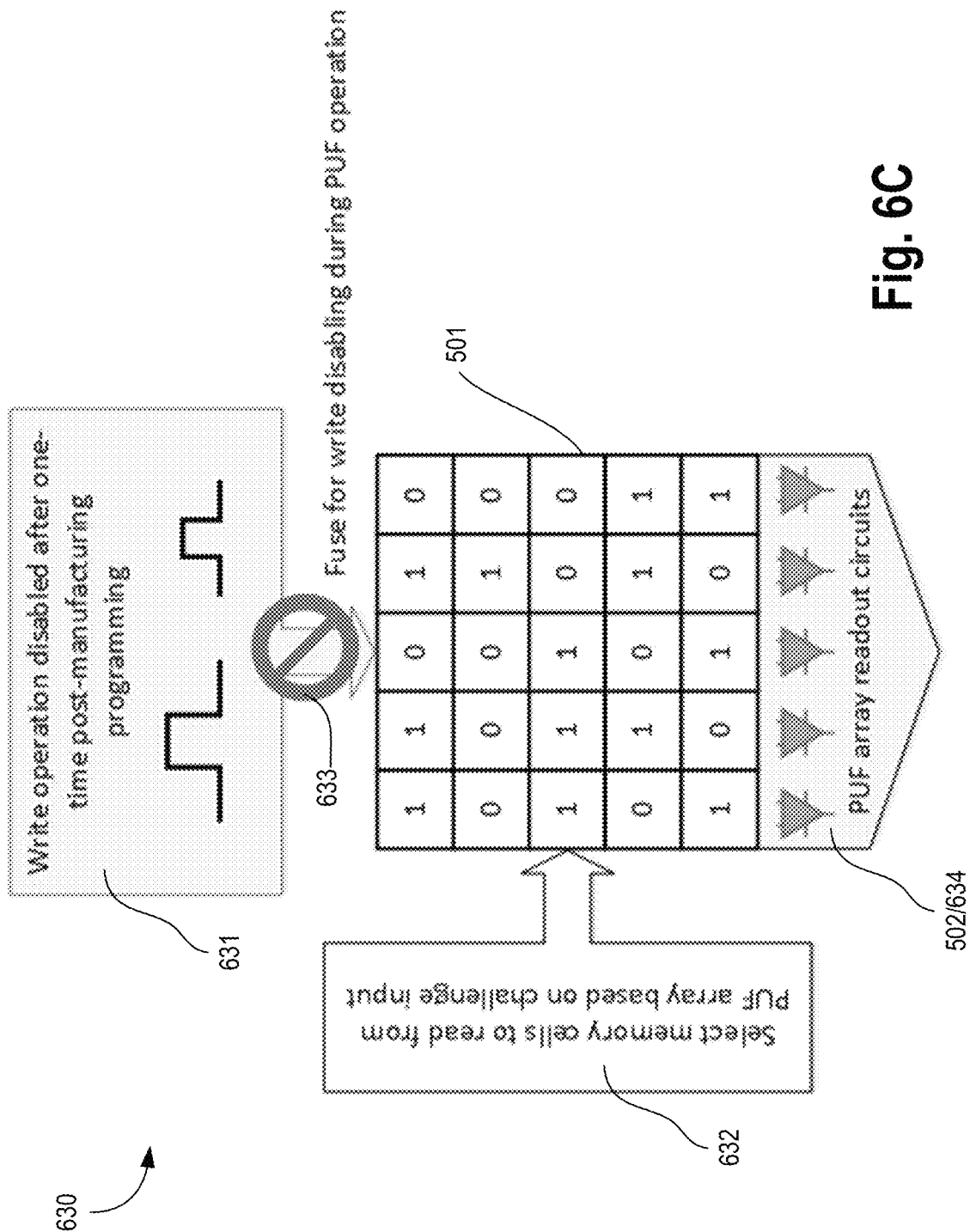

FIGS. 6A-C illustrate processes 600, 620, and 630, respectively, to generate the unique code from an array of PUF magnetic memory cells (e.g., arrays 501), in accordance with some embodiments. In this example, a 5×5 SHE-MTJ memory cell array is used as PUF array 501 to generate stable static entropy. In some embodiments, a sufficiently large write current amplitude (A) and pulse width (PW) are used once after manufacturing of the IC die to ensure all cells in the array 501 are set to a value of 0 (as indicated by block 601) with 100% probability in the presence of thermal noise and process variations. In some embodiments, all cells in the array 501 are set to a value of 1 (instead of 0) with 100% probability in the presence of thermal noise and process variations. In some embodiments, groups of cells are calibrated separately for write characteristics specific to the process technology to determine the useful range of write current A and PW combinations.

In some embodiments, an appropriate range of write current A and PW combinations are used for the cells in the array so that the probability of switching of each cell from 0 to 1 (or 1 to 0) is approximately 0.5 as indicated by block 621. This programming is done once for each PUF array 501 during post manufacturing, in accordance with some embodiments. Then, the non-volatile PUF array contains a unique value of high entropy that is retained for the operational lifetime of the IC die, in accordance with some embodiments.

In some embodiments, the write operation (as indicated by block 631) for the PUF array 501 is permanently disabled using a fuse 633 (or software based techniques) after the one-time post-manufacturing programming operation to ensure that the PUF value cannot be tampered with. For example, Fuse circuitry 507 disables the write circuitry 506 after the write circuitry has performed the one-time post-manufacturing programming operation. Since the write current terminals of the memory cell element are different from the read current terminals (unlike a STT MTJ memory cell), this disabling can be done without impacting the read operation of the PUF array during its normal operational lifetime, in accordance with various embodiments.

In some embodiments, the challenge response pair (CRP) vectors for the PUF array 501 in the IoT are enrolled in an authentication server (not shown) for identification purposes. In some embodiments, during authentication, a challenge input is sent to the PUF array 501. That input (as indicated by block 632) is mapped to selection of some cells in the array 501, in accordance with some embodiments. Those cell values are read using the current sensor readout circuitry 634 (e.g., sensing circuitry 502) to produce the unique PUF response (e.g., PUF_code) to the challenge. In some embodiments, the challenge input may select the enter array 501. The size (or number of bits) of the challenge input may depend on the number of ICs manufactured and/or sold. The response (e.g., PUF_code) is then compared with the previously enrolled response (e.g., Authentication Code of FIG. 5) in the authentication server to verify the identity of the IC die. In some embodiments, a Pass or Fail indicator is generated according to the comparison which indicates whether a malicious attack was made (e.g., Fail output) or whether an authorized access was made (e.g., Pass output).

Figure 7:
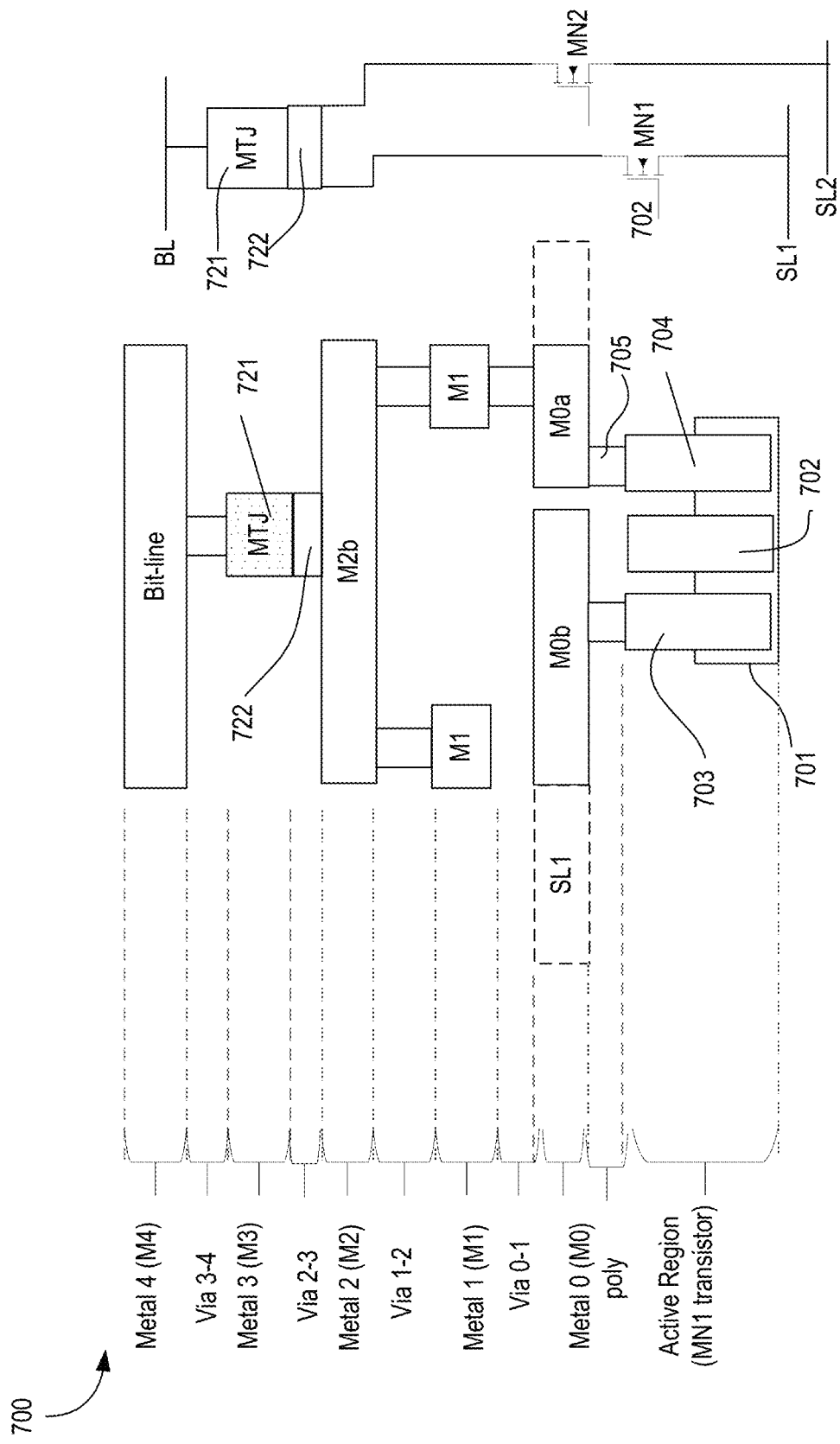
FIG. 7 illustrates a cross-section of a die layout having a magnetic junction with a spin Hall effect based write electrode, of the PUF array of magnetic memory cells, formed in metal 3 (M3) and metal 2 (M2) layer regions, according to some embodiments of the disclosure.

FIG. 7 illustrates a cross-section 700 of a die layout having a magnetic junction with a spin Hall effect based write electrode, of the PUF array of magnetic memory cells, formed in metal 3 (M3) and metal 2 (M2) layer regions, according to some embodiments of the disclosure. Cross-section 700 illustrates an active region having a transistor MN comprising diffusion region 701, a gate terminal 702, drain terminal 704, and source terminal 703. The source terminal 703 is coupled to first SL1 (source line) via poly or via, where the SL1 is formed on Metal 0 (M0). In some embodiments, the drain terminal 704 is coupled to M0a (also metal 0) through via 705. The drain terminal 704 is coupled to electrode 222 through Via 0-1 (e.g., via connecting metal 0 to metal 1 layers), metal 1 (M1), Via 1-2 (e.g., via connecting metal 1 to metal 2 layers), and Metal 2 (M2). For sake of not obscuring the embodiments, the second transistor MN2 and its associated select line (SL2) and word-line are not shown. In some embodiments, transistor MN1, select line SL1, and bit-line BL are used for reading during the PUF operation, while transistor MN2, select line SL2, and bit-line BL are used for writing into the memory.

In some embodiments, the magnetic junction (e.g., MTJ 721 or spin valve) is formed in the metal 3 (M3) region. In some embodiments, the perpendicular free magnet layer 221a of the magnetic junction (MTJ 721 or spin valve) couples to electrode 722 (e.g., electrode 222). In some embodiments, the fixed magnet layer 221c of magnetic junction couples to the bit-line (BL) via electrode 722/222 through Via 3-4 (e.g., via connecting metal 4 region to metal 4 (M4)). In this example, the bit-line is formed on M4.

In some embodiments, n-type transistors MN1 and MN2 are formed in the frontend of the die while the electrode 722 is located in the backend of the die. Here, the term "backend" generally refers to a section of a die which is opposite of a "frontend" and where an IC (integrated circuit) package couples to IC die bumps. For example, high level metal layers (e.g., metal layer 6 and above in a ten-metal stack die) and corresponding vias that are closer to a die package are considered part of the backend of the die. Conversely, the term "frontend" generally refers to a section of the die that includes the active region (e.g., where transistors are fabricated) and low-level metal layers and corresponding vias that are closer to the active region (e.g., metal layer 5 and below in the ten-metal stack die example). In some embodiments, electrode 722 is located in the backend metal layers or via layers for example in Via 3. In some embodiments, the electrical connectivity to the device is obtained in layers M0 and M4 or M1 and M5 or any set of two parallel interconnects.

Figure 8:
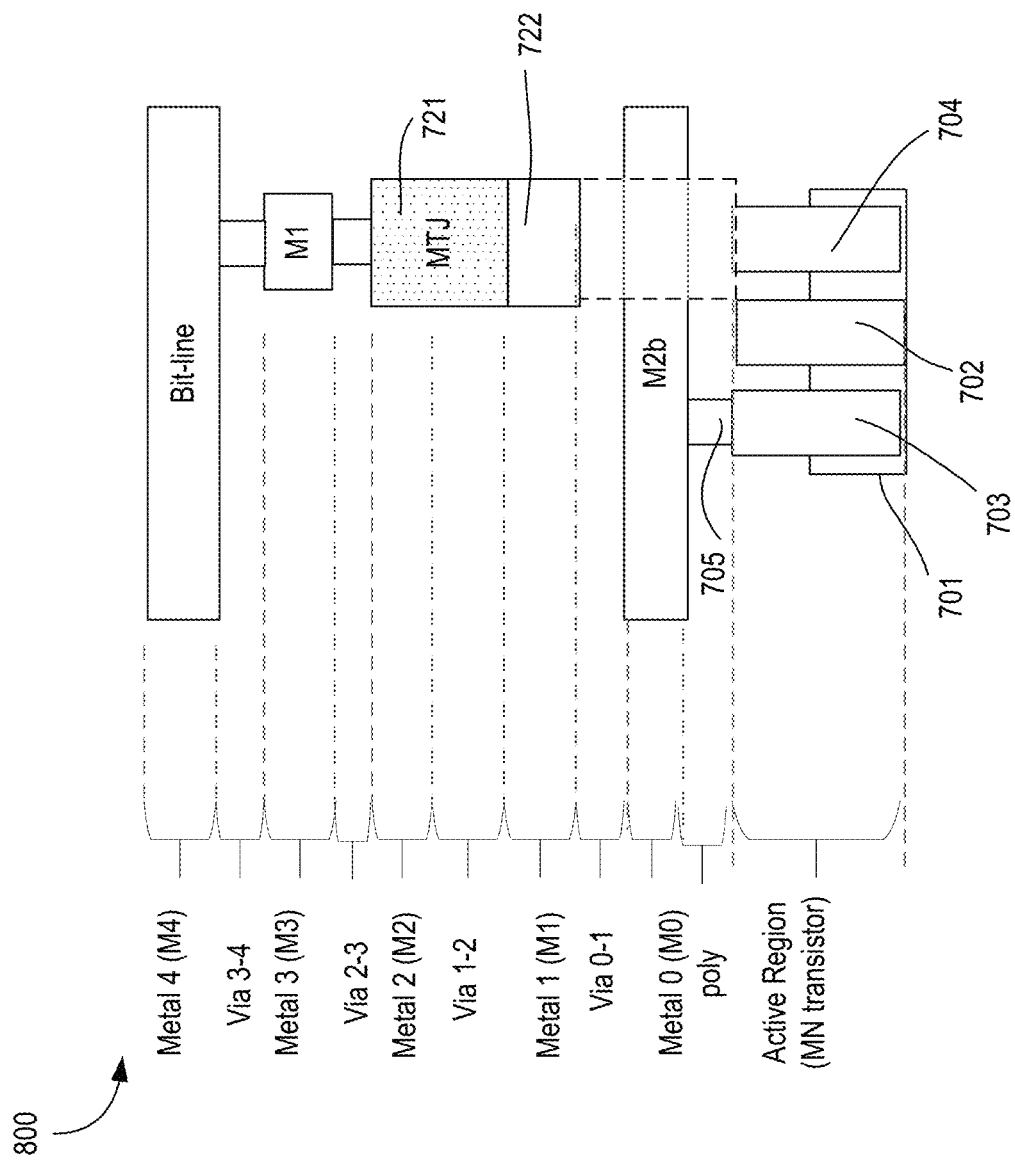
FIG. 8 illustrates a cross-section of a die layout having a magnetic junction with a spin Hall effect based write electrode, of the PUF array of magnetic memory cells, formed in metal 2 (M2) and metal 1 (M1) layer regions, according to some embodiments of the disclosure.

FIG. 8 illustrates cross-section 800 of a die layout having a magnetic junction with a spin Hall effect based write electrode, of the PUF array of magnetic memory cells, formed in metal 2 (M2) and metal 1 (M1) layer regions, according to some embodiments of the disclosure. Compared to FIG. 7, here the magnetic junction (e.g., MTJ 721 or spin valve) is formed in the metal 2 region and/or Via 1-2 region. In some embodiments, electrode 722/522 is formed in the metal 1 region.

Figure 9:
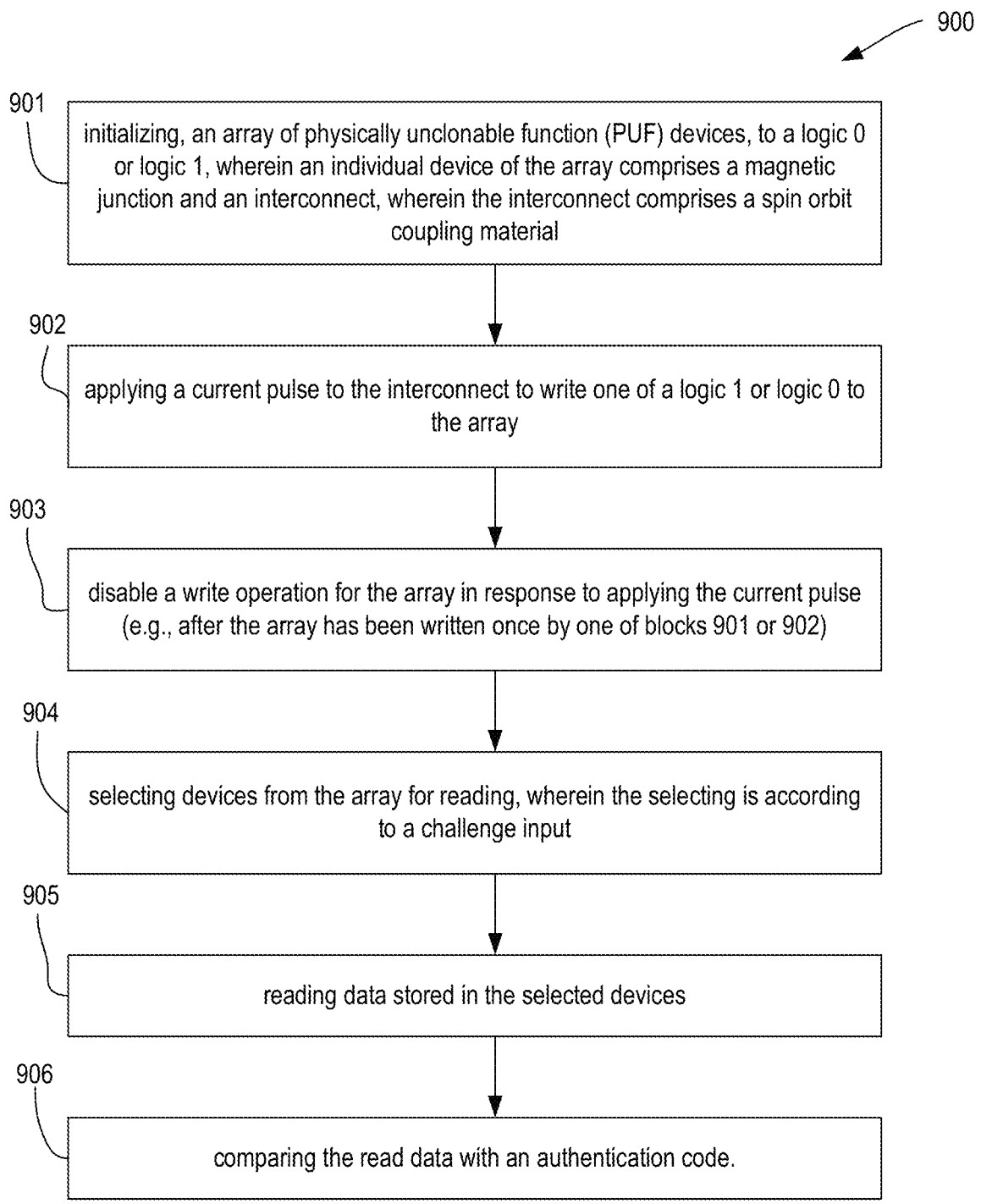
FIG. 9 illustrates a flowchart of a method for realizing a unique authentication code using the PUF array, according to some embodiments of the disclosure.

FIG. 9 illustrates a flowchart 900 of a method for realizing a unique authentication code using the PUF array, according to some embodiments of the disclosure. While the various blocks or operations are illustrated in a particular order, the order can be altered. For example, some blocks may be performed before others while some blocks may be proceeded together with others (e.g., simultaneously).

At block 901, an array of PUFs (e.g., array 501) is initialized with either 0 or 1 such that all memory cells of the PUFs have the same values. For example, a strong enough current pulse (e.g., with a wide pulse width) is passed though electrode 222 of each memory cells of the array to cause it to have a pre-determined value (e.g., logic 0 or logic 1). In some embodiments, row and column selectors 504 and 605 select all cells of the memory array 501, and then write circuitry 506 applies the current of suitable strength (e.g., amplitude) and pulse width to write the same value in all memory array cells of array 501.

At block 902, a current pulse is applied to interconnect 222 such that the memory cells are conditioned to have 0.5 average switching probability. For example, the thermal noise applied for array 501 is such that the average switching probability of the free magnets of the memory cells of the array is substantially 50%. As such, when the current pulse is programmed with a suitable current strength and pulse width to write a logic 1 (or logic 0) to all cells, the memory cells write a logic 1 with 50% probability. In some embodiments, that when logic 1 is being written to the memory cells in this stage, then it is assumed that the memory cells were initialized to zero at block 901. In some embodiments, when logic 0 is being written to the memory cells in this stage, then it is assumed that the memory cells were initialized to zero at block 901. In some embodiments, the logic 1 or logic 0 is written one-time to array 501.

At block 903, the write circuitry 506 is disabled so that the values written into array 501 by the process of block 902 are not disturbed. For example, fuse circuitry 507 can be used to disable the write circuitry 506 so that it can no longer write any data to the already programmed array 501. In some embodiments, write operation is disabled for the array after the array is written once by one of operations of blocks 901 and/or 902/

At block 904, a challenge input 508 is provided to Row and Column Selectors 504 and 505 to select devices or cells from array 501. As such, a unique code from array 501 is read out by reading or sensing circuitry 502. In some embodiments, this read code (also referred to as PUF_code) is stored in a non-volatile memory (e.g., a NAND flash, an MRAM, or any other suitable non-volatile memory) as indicated by block 905. In some embodiments, this PUF_code is stored in a server (not shown) for later authentication of the IC die having this array 501.

At block 905, the process of authentication is started and data stored in the array 501 is read to be compared with an authentication code. At block 906, the PUF_code is compared with the authentication code stored in the server. If the PUF_code, according to a new challenge input 508, is identical to the Authentication Code, then the IC die is authenticated. If the PUF_code, according to a new challenge input 508, is not identical to the Authentication Code, then the IC die is determined to have failed authentication.

Figure 10:
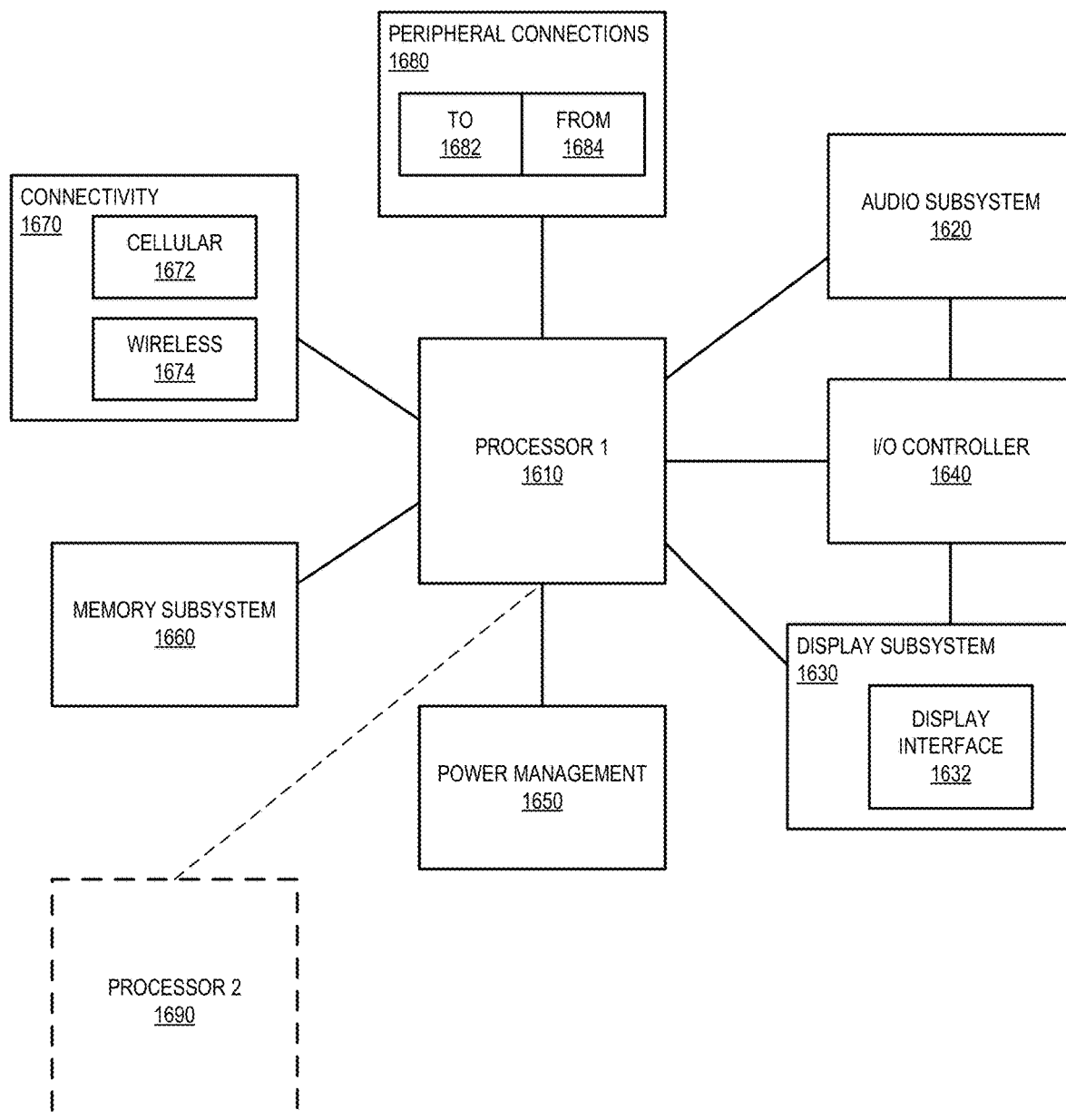
FIG. 10 illustrates a smart device or a computer system or a SoC (System-on-Chip) with one or more PUF arrays of magnetic junctions with spin Hall effect based write electrodes, according to some embodiments of the disclosure.

FIG. 10 illustrates a smart device or a computer system or a SoC (System-on-Chip) with one or more PUF arrays of magnetic junctions with a spin Hall effect based write electrodes, according to some embodiments of the disclosure. In various embodiments, this smart device can be authenticated using the unique code generated by the PUF arrays.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFBT device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 10 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 with one or more PUF arrays (e.g., array 501) of magnetic junctions with a spin Hall effect based write electrodes, according to some embodiments discussed. Other blocks of the computing device 1600 may also include one or more PUF arrays of magnetic junctions with a spin Hall effect based write electrodes, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: an array of physically unclonable function (PUF) devices, wherein an individual device of the array comprises a magnetic junction and an interconnect, and wherein the interconnect comprises a spin orbit coupling material; a circuitry to sense values stored in the array, and to provide an output; and a comparator to compare the output with a code.

Example 2

The apparatus of example 1 comprises a second circuitry to initialize all the devices of the array to one of logic 0 or logic 1.

Example 3

The apparatus of example 2 comprises a third circuitry to apply a programmable current pulse width to the devices of the array to write a logic 1 to the devices.

Example 4

The apparatus of example 3 comprises a fourth circuitry to select memory cells to read from the array, via the circuitry, the output based on a challenge input.

Example 5

The apparatus according to any one of examples 1 to 4, wherein the code is to be stored on a server and is to be provided to the comparator.

Example 6

The apparatus according to any of the preceding apparatus examples, wherein the magnetic junctions of the array of PUF devices have an average switching probability of substantially 50%.

Example 7

The apparatus according to any of the preceding apparatus examples, wherein the magnetic junction comprises: a stack of structures including: a first structure comprising a magnet with unfixed perpendicular magnetic anisotropy (PMA) relative to a plane of a device; a second structure comprising one of a dielectric or metal; and a third structure comprising a magnet with fixed PMA relative to the plane of the device, and wherein the third structure is adjacent to the second structure such that the second structure is between the first and third structures.

Example 8

The apparatus of example 7, wherein the first and second structures include one or more of Co, Fe, Ge, or Ga or Heusler alloys.

Example 9

The apparatus of example 8, wherein the Heusler alloy includes one or more of Co, Cu, Fe, Ga, Ge, In, Mn, Al, In, Sb, Si, Sn, Ni, Pd, Ru, or V.

Example 10

The apparatus of example 7 comprises a second device controllable by a word-line, wherein the second device includes a source and drain, wherein one of the source or drain is coupled to the interconnect, and wherein one of the drain or source is coupled to a select line.

Example 11

The apparatus of example 10, wherein the interconnect is coupled to a second select line via a third device.

Example 12

The apparatus of example 7, wherein the magnetic junction comprises: a fourth structure between the first and second structures, wherein the fourth structure includes one or more of: Ru, Os, Hs, or Fe.

Example 13

The apparatus of example 12, wherein the magnetic junction comprises a fifth structure between the second and third structures, and wherein the sixth structure includes one or more of: Ru, Os, Hs, or Fe.

Example 14

The apparatus of example 7, wherein the dielectric comprises: Mg and O.

Example 15

The apparatus according to any of the preceding apparatus examples, wherein the magnetic junction is one of a spin valve or a magnetic tunneling junction (MTJ).

Example 16

The apparatus according to any of the preceding apparatus examples comprises a bit-line coupled to the magnetic junction.

Example 17

The apparatus according to any of the preceding apparatus examples, wherein the interconnect is to generate spin Hall effect (SHE).

Example 18

The apparatus o according to any of the preceding apparatus examples, wherein the spin orbit coupling material includes one or more or: β-Tantalum (β-Ta), Ta, β-Tungsten (β-W), W, Platinum (Pt), Copper (Cu) doped with elements including on of Iridium, Bismuth or elements of 3d, 4d, 5d and 4f, 5f periodic groups, Ti, S, W, Mo, Se, B, Sb, Re, La, C, P, La, As, Sc, O, Bi, Ga, Al, Y, In, Ce, Pr, Nd, F, Ir, Mn, Pd, or Fe.

Example 19

The apparatus according to any of the preceding apparatus examples, wherein the spin orbit material includes one of a 2D material or a 3D material, wherein the 3D material is thinner than the 2D material.

Example 20

The apparatus according to any of the preceding apparatus examples, wherein the spin orbit material includes materials that exhibit Rashba-Bychkov effect.

Example 21

A system comprising: a memory; a processor coupled to the memory, the processor comprising: an array of physically unclonable function (PUF) devices, wherein an individual device of the array comprises a magnetic junction and an interconnect, wherein the interconnect comprises a spin orbit coupling material; a circuitry to sense values stored in the array, and to provide an output; and a comparator to compare the output with a code; and a wireless interface to allow the processor to communicate with another device.

Example 22

The system of example 21 comprises: a second circuitry to initialize all the devices of the array to one of logic 0 or logic 1; a third circuitry to apply a programmable current pulse width to the devices of the array to write a logic 1 to the devices; and a fourth circuitry to select memory cells to read from the array, via the circuitry, the output based on a challenge input.

Example 23

The system of example 21, wherein the code is to be stored on a server and is to be provided to the comparator, and wherein the magnetic junctions of the array of PUF devices have an average switching probability of substantially 50%.

Example 24

An apparatus comprising: a first circuitry to initialize, an array of physically unclonable function (PUF) devices, to a logic 0 or logic 1, wherein an individual device of the array comprises a magnetic junction and an interconnect, wherein the interconnect comprises a spin orbit coupling material; a second circuitry to apply a current pulse to the interconnect to write one of a logic 1 or logic 0 to the array; and a third circuitry to disable a write operation for the array in response to applying the current pulse.

Example 25

The apparatus of example 24 a fourth circuitry to store data stored in the devices in response to applying the current pulse.

Example 26

The apparatus of example 24 comprises a fifth circuitry to select devices from the array for reading, wherein the selecting is according to a challenge input.

Example 27

The apparatus of example 25 comprises a seventh circuitry to read data stored in the selected devices.

Example 28

The apparatus of example 27 comprises an eighth circuitry to compare the read data with an authentication code.

Example 29

A method comprising: initializing, an array of physically unclonable function (PUF) devices, to a logic 0 or logic 1, wherein an individual device of the array comprises a magnetic junction and an interconnect, wherein the interconnect comprises a spin orbit coupling material; applying a current pulse to the interconnect to write one of a logic 1 or logic 0 to the array; and disabling a write operation for the array in response to applying the current pulse.

Example 30

The method of example 29 comprises storing data stored in the devices in response to applying the current pulse.

Example 31

The method of example 29 comprises selecting devices from the array for reading, wherein the selecting is according to a challenge input.

Example 32

The method of example 29 comprises reading data stored in the selected devices.

Example 33

The method of example 32 comprises comparing the read data with an authentication code.

Example 34

An apparatus comprising: means for initializing, an array of physically unclonable function (PUF) devices, to a logic 0 or logic 1, wherein an individual device of the array comprises a magnetic junction and an interconnect, wherein the interconnect comprises a spin orbit coupling material; means for applying a current pulse to the interconnect to write one of a logic 1 or logic 0 to the array; and means for disabling a write operation for the array in response to applying the current pulse.

Example 35

The apparatus of example 34 comprises means for storing data stored in the devices in response to applying the current pulse.

Example 36

The apparatus of example 34 comprises means for selecting devices from the array for reading, wherein the selecting is according to a challenge input.

Example 37

The apparatus of example 34 comprises means for reading data stored in the selected devices.

Example 38

The apparatus of example 37 comprises means for comparing the read data with an authentication code.

Example 39

A system comprises: a memory; a processor coupled to the memory, the processor including an apparatus according to any one of examples 1 to 20; and a wireless interface to allow the processor to communicate with another device.

Example 40

A system comprises: a memory; a processor coupled to the memory, the processor including an apparatus according to any one of examples 24 to 28; and a wireless interface to allow the processor to communicate with another device.

Example 41

A system comprises: a memory; a processor coupled to the memory, the processor including an apparatus according to any one of examples 34 to 38; and a wireless interface to allow the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
an array of physically unclonable function (PUF) devices, wherein an individual device of the array comprises a magnetic junction and an interconnect, and wherein the interconnect comprises a spin orbit material;
a circuitry to sense values stored in the array, and to provide a unique output; and
a comparator to compare the unique output with an authentication code, wherein the magnetic junction comprises: a stack of structures including:
a first structure comprising a magnet with unfixed perpendicular magnetic anisotropy (PMA), wherein the first structure has an anisotropy axis perpendicular to a plane of a device;
a second structure comprising one of a dielectric or metal; and
a third structure comprising a magnet with fixed PMA, wherein the third structure has an anisotropy axis perpendicular to the plane of the device, and wherein the second structure is between the first and third structures.

2. The apparatus of claim 1, wherein the circuitry is a first circuitry, wherein the apparatus comprises a second circuitry to initialize all the devices of the array to one of logic 0 or logic 1.

3. The apparatus of claim 2 comprises a third circuitry to apply a programmable current pulse width to the devices of the array to write a logic 1 to the devices.

4. The apparatus of claim 3 comprises a fourth circuitry to select memory cells to read from the array, via the first circuitry, the output based on a challenge input.

5. The apparatus of claim 1, wherein the code is to be stored on a server and is to be provided to the comparator.

6. The apparatus of claim 1, wherein the magnetic junctions of the array of PUF devices have an average switching probability of substantially 50%.

7. The apparatus of claim 1, wherein the first and second structures include one or more of Co, Fe, Ge, or Ga or Heusler alloys.

8. The apparatus of claim 7, wherein the Heusler alloy includes one or more of Co, Cu, Fe, Ga, Ge, In, Mn, Al, In, Sb, Si, Sn, Ni, Pd, Ru, or V.

9. The apparatus of claim 1 comprises a second device controllable by a word-line, wherein the second device includes a source and drain, wherein one of the source or drain is coupled to the interconnect, and wherein one of the drain or source is coupled to a select line.

10. The apparatus of claim 9, wherein the interconnect is coupled to a second select line via a third device.

11. The apparatus of claim 1, wherein the magnetic junction comprises: a fourth structure between the first and second structures, wherein the fourth structure includes one or more of: Ru, Os, Hs, or Fe.

12. The apparatus of claim 11, wherein the magnetic junction comprises a fifth structure between the second and third structures, and wherein the fifth structure includes one or more of: Ru, Os, Hs, or Fe.

13. The apparatus of claim 1, wherein the dielectric comprises: Mg and O.

14. The apparatus of claim 1, wherein the magnetic junction is one of a spin valve or a magnetic tunneling junction (MTJ).

15. The apparatus of claim 1 comprises a bit-line coupled to the magnetic junction.

16. The apparatus of claim 1, wherein the interconnect is to generate spin Hall effect (SHE).

17. The apparatus of claim 1, wherein the spin orbit material includes one or more or: (β-Tantalum (β-Ta), Ta, β-Tungsten (β-W), W, Platinum (Pt), Copper (Cu) doped with elements including on of Iridium, Bismuth or elements of 3d, 4d, 5d and 4f, 5f periodic groups, Ti, S, W, Mo, Se, B, Sb, Re, La, C, P, La, As, Sc, O, Bi, Ga, Al, Y, In, Ce, Pr, Nd, F, Ir, Mn, Pd, or Fe.

18. The apparatus of claim 1, wherein the spin orbit material includes one of a 2D material or a 3D material, wherein the 3D material is thinner than the 2D material.

19. The apparatus of claim 1, wherein the spin orbit material includes materials that exhibit Rashba-Bychkov effect.

20. A system comprising:
a memory;
a processor coupled to the memory, the processor comprising:
an array of physically unclonable function (PUF) devices, wherein an individual device of the array comprises a magnetic junction and an interconnect, wherein the interconnect comprises a spin orbit material;
a circuitry to sense values stored in the array, and to provide a unique output; and
a comparator to compare the unique output with an authentication code; and
a wireless interface to allow the processor to communicate with another device, wherein the magnetic junction comprises: a stack of structures including:
a first structure comprising a magnet with unfixed perpendicular magnetic anisotropy (PMA), wherein the first structure has an anisotropy axis perpendicular to a plane of a device;
a second structure comprising one of a dielectric or metal; and
a third structure comprising a magnet with fixed PMA, wherein the third structure has an anisotropy axis perpendicular to the plane of the device, and wherein the second structure is between the first and third structures.

21. The system of claim 20, wherein the circuitry is a first circuitry, and wherein the processor comprises:
a second circuitry to initialize all the devices of the array to one of logic 0 or logic 1;
a third circuitry to apply a programmable current pulse width to the devices of the array to write a logic 1 to the devices; and
a fourth circuitry to select memory cells to read from the array, via the first circuitry, the output based on a challenge input.

22. The system of claim 20, wherein the code is to be stored on a server and is to be provided to the comparator, and wherein the magnetic junctions of the array of PUF devices have an average switching probability of substantially 50%.

23. An apparatus comprising:
a first circuitry to initialize, an array of physically unclonable function (PUF) devices, to a logic 0 or logic 1, wherein an individual device of the array comprises a magnetic junction and an interconnect, wherein the interconnect comprises a spin orbit material;

a second circuitry to apply a current pulse to the interconnect to write one of a logic 1 or logic 0 to the array;

a third circuitry to disable a write operation for the array in response to applying the current pulse, wherein the magnetic junction comprises: a stack of structures including:

- a first structure comprising a magnet with unfixed perpendicular magnetic anisotropy (PMA), wherein the first structure has an anisotropy axis perpendicular to a plane of a device:
- a second structure comprising one of a dielectric or metal; and
- a third structure comprising a magnet with fixed PMA, wherein the third structure has an anisotropy axis perpendicular to the plane of the device, and wherein the second structure is between the first and third structures.

24. The apparatus of claim 23 comprises:

a fourth circuitry to store data stored in the devices in response to applying the current pulse;

a fifth circuitry to select devices from the array for reading, wherein the selecting is according to a challenge input;

a seventh circuitry to read data stored in the selected devices; and an eighth circuitry to compare the read data with an authentication code.

* * * * *